United States Patent
Kurhila et al.

(10) Patent No.: US 6,996,373 B2
(45) Date of Patent: Feb. 7, 2006

(54) BASE STATION (75) Inventors: Mikko Kurhila, Espoo (FI); Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 10/173,573

(22) Filed: Jun. 18, 2002

(65) Prior Publication Data

US 2004/0203423 A1   Oct. 14, 2004

(51) Int. Cl.
    *H04B 17/00*    (2006.01)
(52) U.S. Cl. ............... 455/67.11; 455/560; 455/561
(58) Field of Classification Search ......... 455/67.11, 455/560
    See application file for complete search history.

(56) References Cited

U.S. PATENT DOCUMENTS

| 5,361,400 A | * | 11/1994 | Kazecki et al. ............ 455/63.1 |
| 6,167,031 A | * | 12/2000 | Olofsson et al. ............ 370/252 |
| 6,373,903 B1 | * | 4/2002 | Wynn ...................... 375/308 |
| 6,456,830 B2 | * | 9/2002 | Ogino et al. ............... 455/134 |
| 6,483,452 B1 | * | 11/2002 | Iwakini ..................... 342/20 |
| 6,745,045 B2 | * | 6/2004 | Terry et al. ................ 455/522 |
| 2002/0071053 A1 | * | 6/2002 | Wittig ...................... 348/500 |
| 2003/0002495 A1 | * | 1/2003 | Shahar et al. .............. 370/389 |
| 2004/0234004 A1 | * | 11/2004 | Ketchum et al. .......... 375/267 |

* cited by examiner

*Primary Examiner*—Nay Maung
*Assistant Examiner*—Angelica M. Perez
(74) *Attorney, Agent, or Firm*—Pillsbury Winthrop Shaw Pittman LLP (57) ABSTRACT

A base station receiver of a wireless communications system is provided with a channel analyser that, on the basis of an information derived from an RF signal received from user equipment over an air interface, provides channel status information representing a condition of a transmission channel between the user equipment and the base station receiver. The operation of a modulation detector, a jamming detector, and/or a selector selecting a burst detector is controlled on the basis of the estimated channel status information.

16 Claims, 3 Drawing Sheets

BASE STATION

FIELD OF THE INVENTION

The present invention relates to wireless communications systems, and more particularly to mechanisms for improving the performance of a base station.

BACKGROUND OF THE INVENTION

In wireless communications networks, a base station is a network element providing an air interface between the radio units of mobile subscribers and the networks infrastructure (sometimes referred to as Switching and Management Infrastructure, SwMI). The base station is responsible for radio transmission and reception to and from wireless subscriber stations over the air interface. An example of a basic architecture of a base station receiver is shown schematically in FIG. 1. RF parts 11 amplify radio frequency (RF) signals received from an antenna 10, provide selectivity and mix the received carrier to a lower intermediate frequency (IF), which is then delivered to the baseband sections, such as the synchronization block 12, diversity combining 13 and the detector 14. If the diversity reception is employed, the baseband signals can be combined in the diversity-combining block 14. This improves the bit error rate considerably. A base station receiver may also include modulation detection that is used for detecting whether or not the received signal is modulated according to the modulation method used in the specific radio system. The base station may further include jamming detection. The jamming detection is a base station feature indicating whether the base station is receiving a jamming signal, i.e. an interference signal, over the radio interface, usually from a mobile station, with the possible aim of causing network malfunction. These functionalities are only examples of different functionalities a base station may include.

BRIEF DISCLOSURE OF THE INVENTION

An object of the present invention is to provide new methods and base stations for implementing the method so as to provide better sensitivity. The object of the invention is achieved by methods and base station receivers, which are characterized by what is stated in the independent claims. Preferred embodiments of the invention are disclosed in the dependent claims.

An aspect of the invention is a method of controlling a base station receiver in a wireless communications system, the method comprising receiving at a base station receiver a signal from a user equipment over an air interface estimating, on the basis of information derived from said received signal, channel status information representing a condition of a transmission channel between the terminal equipment and the base station receiver, and adaptively controlling one or more of the following operations in a base station on the basis of the estimated channel status information: modulation detection, jamming detection, and selection of a detector.

In an embodiment of the invention, the estimated channel condition information is utilised for controlling modulation detection.

In an embodiment of the invention, the estimated channel condition information is utilised for a more precise and faster selection of a detector for a certain type of channel.

In an embodiment of the invention, the estimated channel condition information is utilised for controlling jamming detection.

BRIEF DESCRIPTION OF THE DRAWINGS

In the following, the invention will be described in greater detail by means of the preferred embodiments and with reference to the accompanying drawings, in which.

DETAILED DESCRIPTION OF THE INVENTION

The principles of the present invention can be applied to a base station of any wireless communication system. The operation and architecture of the wireless communication system are not relevant to the invention but they are described only to a degree that will assist in comprehending the invention and embodiments thereof. An example of a wireless communication system wherein the principles of the invention can be applied is a TETRA (Terrestial Trunked Radio) system. For a more detailed description of the TETRA system, reference is made to the ETSI (European Telecommunications,Standards Institute) TETRA specifications that are available on the ETSI home site, www.etsi.org. Other examples of a wireless communication system include the GSM (Global System for Mobile Communications) digital cellular communication system and the UMTS (Universal Mobile Telecommunications System) system.

Figure 2:
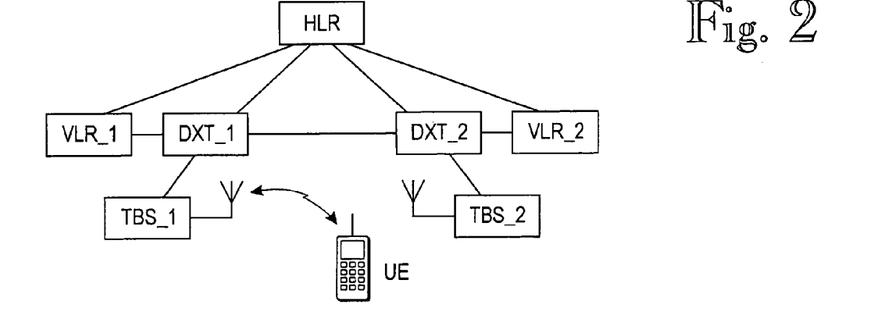
FIG. 2 illustrates an example of an architecture of a wireless system.

FIG. 2 is a simplified schematic diagram illustrating an example of a TETRA network architecture. The TETRA system is a digital mobile communications system developed primarily for public safety and security, for public trunking operators, and for utilities and industry. The network architecture, as illustrated in the example of FIG. 2, comprises digital exchanges DXT_1, DXT_2 (DXT, Digital Exchange for TETRA) to which base stations TBS_1, TBS_2 (TBS, TETRA Base Station) are connected. HLR (Home Location Register) represents a network register where all subscriber parameters of mobile subscribers of the user equipments UE are stored. Visited Location Register VLR represents a network register where all subscriber parameters for call set-up are stored as long as the user equipments UE are in a location area controlled by this register. VLR registers may be located in association with the exchanges.

The present invention relates to a receiver section of a base station, such as the base stations TBS_1 and TBS_2 in FIG. 2.

The purpose of the present invention and its embodiments is to enhance the capability of a cellular network base station by utilising the channel status information that can be derived from the received signal by estimating the channel the received signal has passed through, for improving the performance of the base station receiver section.

Channel Estimation

In order to use the information on the channel, the condition of the channel must be estimated or the status of the channel must be recognised. There are many different ways to implement channel status recognition. One possible solution can be a radial velocity estimation of the user equipment UE, in which method it is estimated how fast the channel is changing. The faster the user equipment moves, the bigger the potential changes in the channel. This is especially true in communications systems wherein the symbol rate can be low (slow), such as TETRA or EDGE (Enhance Data rate for Global Evolution).

There is a variety of methods for extracting velocity estimates. In accordance with an embodiment of the invention, one of the simplest methods uses the difference of maximum amplitudes in different parts of the burst of the logical channel. If the burst is divided into three parts, the velocity estimate can be expressed as the following algorithm:

$$v(n) = 0.9 * v(n-1) + 0.7 * \left( \sum_{k=1}^{n-1} |\max[s_k - s_{k+1}]| \right),$$  (1)

where v(n) is a speed estimate (for instance in km/h) and $S_k$ represents different parts of the burst. The term $|\max|[(S_k)-(S_{k-1})]|$ describes how much the signal level has changed within one burst from one signal part to another, i.e. maximum signal level differences. It should be appreciated that 0.9 and 0.7 are only example values for the scaling factors, and that other values can be used instead.

In further embodiments of the invention, the methods for extracting velocity estimates include, for example, an LCR (Level Crossing Rate) velocity estimation method and an ACF (Auto Correlation Function) velocity estimation method.

In an embodiment, a method used for the channel status recognition is the estimation of the effect of ISI (Inter Symbol Interference) in a radio path between the terminal equipment and TBS.

In this method, the effect of interfering multipath propagation on the channel is estimated e.g. by calculating the cross correlation between the training sequence and the signal. If the signal is clearly delayed, it implies a strong interference. Many different functions can be included in this method, e.g. the analysis of fading characteristics.

The estimation of the effect of the ISI can be carried out by using a simple recursive algorithm, for example, which updates the information of channel tap sizes.

$$h_i(n) = C * h_i(n-1) + D * \max|\text{xcorr}(\text{sig}, Tr)|_{\text{off}},$$ (2)

where C and D are scaling factors, $h_i$ is the i:th tap of the equalizer and $\max|\text{xcorr}(\text{sig}, Tr)|_{\text{off}}$ are absolute values of the cross correlation between the received signal and a training sequence. The figures C=0.3 and D=0.7 are examples of scaling factors. The training sequence can be defined as a sequence for error correction purposes carried by the signal travelling in the channel. The training sequence symbol enables synchronization to be performed and detectors to be initialised. The subscript off in the above equation refers to the offset for the peak of cross correlation for each tap, which is used for synchronization.

After the channel conditions have been estimated, the obtained information can be utilized in baseband processing functionalities of the base station receiver. A number of receiver functionalities or blocks are controlled on the basis of the channel knowledge information in accordance with the principles of the present invention and its embodiments. In an embodiment of the invention, the channel information is utilized for controlling any combination of these functionalities in a base station. In a further embodiment of the invention, only one of these functionalities is present or controlled in a base station.

Selecting Detector Packages According to the Channel Information

An object of this aspect of the invention is to enhance the sensitivity of a base station receiver by utilising the information that can be derived from the received signal by estimating the channel the signal has passed through.

In TDMA (Time Division Multiple Access) systems, the physical channel is a time slot. There can be a preset number of time slots, i.e. physical channels, on a same carrier frequency. The physical channel can transport several types of logical channels (traffic channels and control channels), i.e. the logical channels are mapped to the physical channels. A burst is a period of an RF carrier which is modulated by a data stream. A burst thus presents the physical content of the timeslot or a subslot. The burst, i.e. the modulated data stream in the time slot, also contains a training sequence, typically in the center of the time slot. In the TETRA system there are four time slots arranged to form a TDMA frame. Another example is eight time slots per a TDMA frame. In the TETRA system, for example, the length of one burst enables the channel conditions to change remarkably during the burst. This means that the detector which offers the best performance during a training sequence, might not be the best detector during the other parts of the burst.

Certain detectors perform in an optimal manner in certain channel models. Therefore, one possible way to solve this problem is to run several detectors in parallel and choose the output soft bits for a certain part of the burst from the detector that has performed best during that part of the burst. This is maybe the most reliable solution for selecting the correct detector for a certain burst. However, running several complicated detection algorithms requires a huge amount of calculation capacity from the receiver processor, and therefore it is not possible or desired to run all different detectors in parallel during the whole burst.

However, a certain detector package which contains two or more detectors can be run parallel if the overall complexity of the solution does not require too much calculating capacity. Selecting an adequate detector package for the burst to be detected would improve the sensitivity of the receiver. The selection algorithm should select the correct detector package as reliably as possible since selecting a non-optimal detector package that is optimal in some other channel conditions decreases the performance of the detector.

One solution for selecting the detector package could be to use the error metric during the training sequence as the decision criterion. However, this will not give reliable decisions in the case of a rapidly changing channel since the channel type can be totally different in the rest of the burst (outside the training sequence. This applies especially to a long burst structure, like the TETRA burst structure.

According to the present invention, this selection of detectors can be improved by utilizing knowledge about the channel a signal is experiencing. The knowledge of or information on the channel may be obtained as described above. Selecting the detector package by using the channel information obtained with a channel analyser as the decision criterion improves the reliability of the detector selection algorithm. This directly improves the sensitivity of the receiver as compared to a receiver which makes the decision based on the performance of the detectors during a training sequence. The gain is most impressive in systems where the duration of a burst is quite long, since channel conditions can then change totally during the burst.

Figure 1:
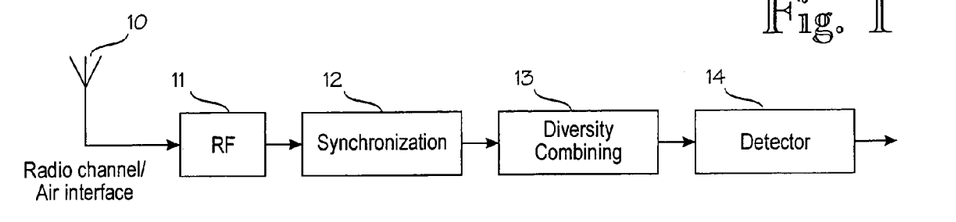
FIG. 1 illustrates an example of an architecture of a base station receiver.
Figure 3:
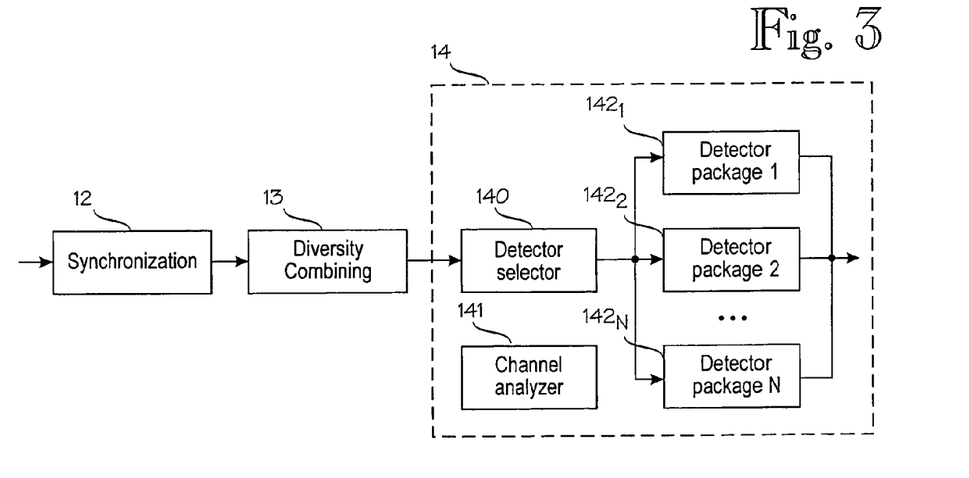
FIG. 3 illustrates an example of an architecture of a base station receiver according to an embodiment of the present invention.

An example of a base station receiver that uses several different detector packages and a channel analyser for selecting a correct one is illustrated in FIG. 3. The synchronisation 12 and the diversity combining 13, which can be similar to those shown in FIG. 1, are not essential to this aspect of the invention. The detector 14 includes N detector packages $142_1 \ldots 142_N$. A detector selector 140 selects one of the detector packages $142_1 \ldots 142_N$ at a time for the burst. The most practical place for the detector selector 140 is just before the detector packages $142_1 \ldots 142_N$. A detector selection algorithm controlling the detector selector makes the decision based on the observation of a channel type analyser 141. The channel analyser can provide the channel estimate information using the methods described above, for example. The channel analyser 141 can be placed anywhere in the receiver but it is more practical to place the analyser 141 just before the detector packages $142_1 \ldots 142_N$. This enables the information about a current burst to be used for selecting the detector package. Typically, certain channel conditions, like speed, do not change extremely quickly during a call. This means that in logical channels other than access channels, also the information about previous channels could be used for selecting the correct detector package. This, of course, is not possible for the access channel, since there is no history information available about the channel conditions.

One simple example of the use of a detector selector is a receiver with only two detectors, such as a carrier tracker and a 2-tap MLSE equalizer. The carrier tracker performs clearly better in flat fading channels and AWGN channels (noisy channels), whereas the equalizer performs better in channels with a strong ISI (Inter Symbol Interference) effect. Flat fading is fading caused by the reflected signals from nearby objects. The channel analyser 141 decides which detector performs better in the observed channel type, and controls the detector selector 140 to select the detector packages accordingly. In other words, when a flat-fading channel is observed, the carrier tracker (e.g. detector package $142_1$) is used in the detection. When a channel with a strong ISI effect is observed, the equalizer (e.g. detector package $142_2$) is used in the detection. A further example is a detector package including a coherent type of detector with an alpha parameter value that only allows slow adjustment of a channel estimate tap when a channel is recognized to have a low ISI effect or no ISI effect at all. Still further, there may be detector packages that can be chosen to maximise the detector performance in regard of velocity of the user equipment.

In this example, there is only one detector in each detector package $142_1 \ldots 142_N$. However, one or more detector packages $142_1 \ldots 142_N$ can contain a group (two or more) of parallel detectors. If a detector package contains more than one detector, there must be another detector selection algorithm which selects the detector within the package by measuring the performance of all detectors in the package. The soft bits for a certain part of the burst can be chosen from the detector with the best performance in that part of the burst.

An advantage of this aspect of the invention is that it enables the usage of a channel specific detector package after the channel and its characteristics have been analysed in reception. By means of a specific type of detector or equalizer, more sensitivity may be gained, which also affects the coverage area of the base station. The optimal composition of the detector varies depending on the channel conditions.

Advanced Modulation Detection

An object of this aspect of the invention is to utilise the information that can be obtained from the received signal for estimating the channel the signal has passed through in order to provide a more reliable modulation detection feature.

In each radio system, a specific modulation method is used for radio signals. For example, the TETRA system uses a robust π/4 DQPSK (Pi/4 Quaternary Phase Shift Keying) modulation with a root-raised cosine modulation filter. The received signal can be recognized as a modulated signal, i.e. a desired signal, if predetermined modulation characteristics are detected in the signal. For example, in the TETRA modulation, each modulation symbol has a predetermined phase or time relation to the previous modulation symbol. This can be used for classifying the received bursts as modulated (accepted) and unmodulated (unaccepted) bursts.

In the TETRA system, the modulation detection is based on a cross-correlation algorithm. A cross-correlation vector is calculated between training sequence samples of the incoming signal data and the selected training sequence reference signal. A modulation detection function starts when the receiver has received an incoming uplink burst up to a training sequence. The rest of the burst is not essential in defining whether or not the received burst is TETRA modulated. Hence, needless calculation over the last half of data of an incoming signal is left out and a waste of processor resources is avoided.

The calculated complex correlation vector is composed of imaginary and quadrature components at a rate of 3 samples per symbol. Also the complex reference signal is adjusted at the same rate. The time displacement, τ, between the two samples is thus one third of symbol time.

After the correlation vector has been built up, the mean value $E(R_{xy})$ of the vector is calculated in order to define the average magnitude of the vector. A fixed modulation window defines the length of the part of the received burst that is used in correlation calculations. The modulation window is selected such that it definitely contains the training sequence of the received burst. Next, a peak value $P(R_{xy})$ is searched from the correlation vector and it is stored for further use. The peak is assumed to be in the center of the training sequence.

The decision in the modulation detection is carried out by comparing a scaled mean value with the peak value achieved in earlier calculations. The comparison is performed by means of a subtraction operation as presented in following equation:

$$T=P(R_{xy})-C*E(R_{xy}) \quad (3)$$

If the resulting value T is higher than zero, the burst is considered to be TETRA modulated and the procedure continues. Otherwise, the burst is unmodulated and modulation detection starts over with the next burst. C is a constant whose value is found experimentally.

$T\leq 0$, Modulated signal $T>0$, Unmodulated signal $\quad (4)$

The optimal value of the constant C used in modulation detection depends on the channel type. In rapidly changing channels, the limit cannot be set as high as in static channels since the amplitude of the signal vary more during the burst. This can increase the mean value of the correlation such that the burst is considered to be unmodulated even though it has just passed through a difficult dynamic channel, if the constant value C suitable for a static channel is used. This makes the decision of the modulation detection more uncertain. A rapidly changing channel may appear in a situation, for example, where the velocity of the user equipment is high, causing the channel power to change rapidly.

According to this aspect of the invention, the performance of modulation detection is improved by means of adjusting the modulation detection on the basis of the channel information (e.g. speed, etc.). In an embodiment of the invention, the modulation detection limit is adjusted. For example, the use of a lower modulation detector limit for rapidly changing channels than for "normal" channels improves the performance of a modulation detector.

In an embodiment of the invention, the modulation detector is modified such that the constant C described above is a function of a channel parameter(s), e.g. the speed of the user equipment:

$$c=f(v) \quad (5)$$

where v is the speed estimation. If the speed has been high, the channel power changes rapidly. This makes the decision of modulation detection more uncertain since the mean value $E(R_{xy})$ might have increased. By decreasing the constant C, and thus the modulation detection limit for rapidly changing channels, the performance of the modulation detector is improved. In other words, the modulation detector is made less sensitive, which means that it has a lower tendency to discard bursts (classify bursts as unmodulated ones) in difficult channel conditions. On the other hand, with a more static channel, the constant C can be increased such that the modulation detector is more sensitive and has a higher tendency to disregard bursts.

Figure 4:
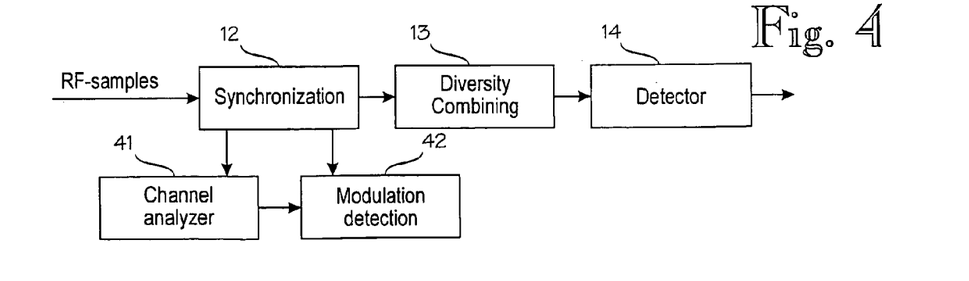
FIG. 4 illustrates an example of an architecture of a base station receiver according to an embodiment of the present invention.

An example of a base station receiver that uses the enhanced modulation detection according to the invention is shown in FIG. 4. The diversity combining 13 and the detector 14, which can be similar to those shown in FIG. 1, are not essential to this aspect of the invention. The most optimal place for modulation detection 42 is within or in association with the synchronization 12 since the method for modulation detection is based on a cross correlation calculation and therefore it can be performed simultaneously with the synchronization 12. However, the modulation detection can alternatively be carried out by means of some other metric for the decision and therefore there are also other possible locations for the modulation detection in the architecture of the receiver. The channel information can be used for improving the reliability of the modulation detector 42 irrespective of the location and implementation of the modulation detector 42. The channel analyser 41 can provide the channel estimate information using the methods described above, for example. The channel analyser 41 can be placed anywhere in the receiver but it is most practical to place the analyser 41 in association with the synchronization 12 and the modulation detection 42.

Figure 5:
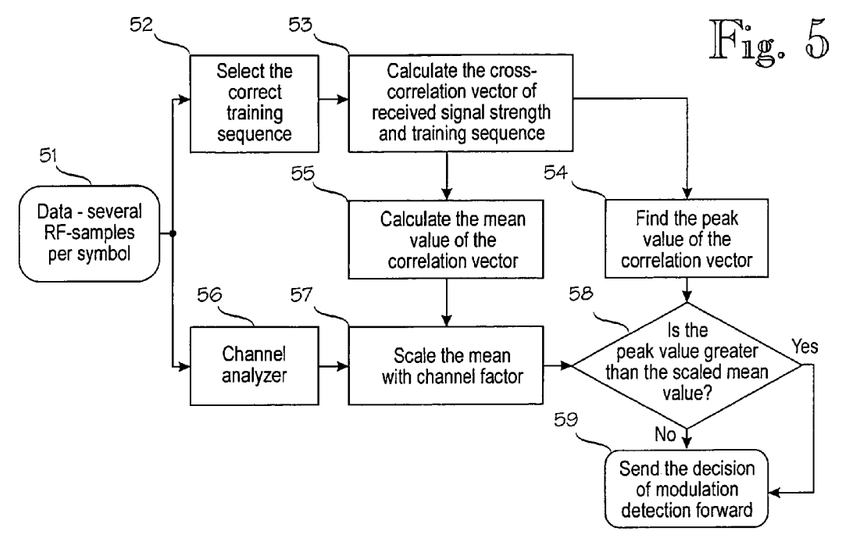
FIG. 5 is a flow diagram illustrating an example of the operation of the receiver shown in FIG. 4.

An example of the advanced modulation detection according to the present invention is illustrated in FIG. 5. Firstly, the received data, i.e. several RF samples per symbol, are received from the RF part 11 of the receiver by the synchronizer 12 (and applied to the channel analyser 41 and the modulation detector 42 in step 51). The modulation detector 42 identifies and selects the correct training sequence in the received data and calculates a cross-correlation vector between the training sequence samples of the incoming signal data and the selected training sequence reference signal (steps 52 and 53) in a manner described above. Further, the modulation detector calculates the mean value of the correlation vector (step 55) and finds the peak value of the correlation vector (step 54) in a manner described above. The channel analyser 41 analyses the channel on the basis of the received RF samples and provides information about the type of the channel for the modulation detector 42 (step 56). The channel information may include the velocity estimate v(n) of the estimation $h_1$(n) of the effect of the ISI determined in equation (1) and equation (2), respectively. The modulation detector 42 then scales the mean value of the correlation vector with the channel information (step 57). This can be embodied by varying the value of the constant C in equation (3) depending on the channel information. For example, if the channel information includes the speed estimation v(n) of the user equipment, the constant C can be varied as a function of the speed estimate in accordance with equation (5). The modulation detector 42 then compares the peak value and the scaled mean value of the correlation vector (step 58), e.g. in a manner presented in equation (3). The comparison results in the modulation detection decision in accordance with equation (4), the result being either "modulated signal" (T<0), or "unmodulated signal" (T>0). The decision of the modulation detection is then forwarded to the sections of the receiver that are capable of utilizing this information. An example of the receiver section which may utilize the modulation detection decision is the jamming detector, as will be explained in detail below. Next, the process proceeds to the next burst.

Advanced Jamming Detection

An object of this aspect of the invention is to utilize information that can be obtained from the received signal for estimating the channel the signal has passed through in order to improve the performance of jamming detection in a base station receiver. The jamming detection is a base station feature indicating whether the base station is receiving a jamming signal, i.e. an interference signal over the radio path, usually from a mobile station, with the possible aim of causing network malfunction.

Figure 6:
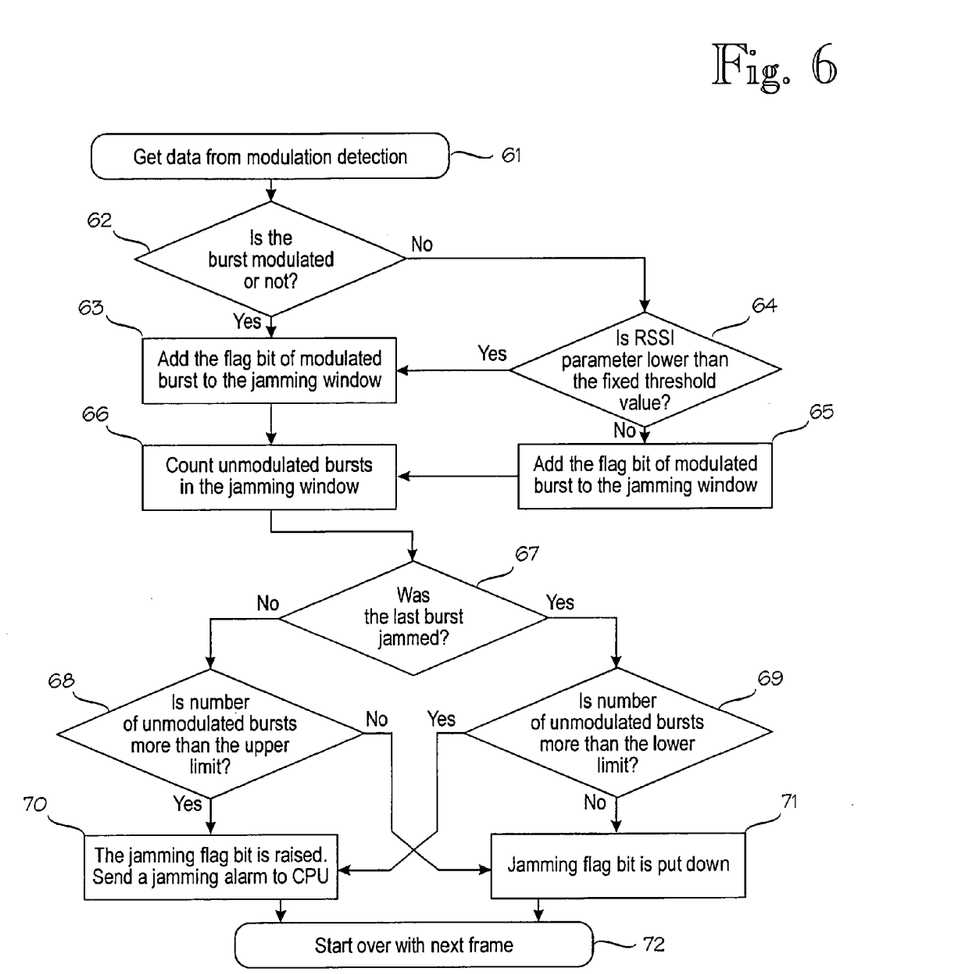
FIG. 6 is a flow diagram illustrating an example of the operation of jamming detection.
Figure 7:
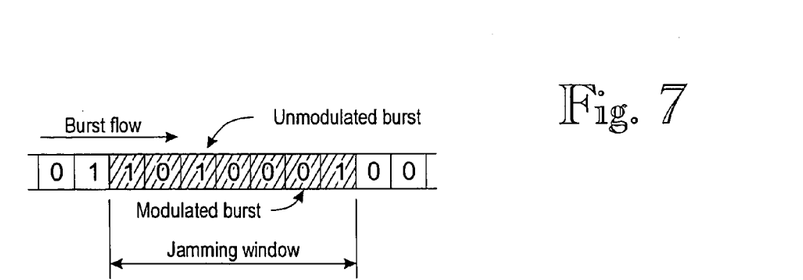
FIG. 7 illustrates a principle of a jamming window.

An illustrative example of an existing jamming detection algorithm is described below with reference to FIGS. 5 and 6. This jamming detection algorithm makes use of the information produced in the modulation detection function (step 61 in FIG. 6) and some other earlier processes. Hence, the performance of the current jamming detection is closely related to the performance of the modulation detection. More particularly, the jamming detection counts the number of unmodulated bursts received within a time window of a fixed size. The time window (called a jamming window herein) slides in time domain over the received status bits of modulation detection. The jamming detector checks whether or not the burst is modulated (step 62). If the burst is modulated, a flag bit of a modulated burst is added to the jamming window (step 63). If the burst is unmodulated, it is checked whether the RSSI parameter (Received Signal Level Indicator) is lower than a fixed threshold value (step 64). The reason for this checking is explained below. If the RSSI parameter is lower than the threshold, the process proceeds to step 63 wherein a flag bit of a modulated burst is added to this burst in the jamming window. However, if the RSSI parameter is higher than the threshold in step 64, a flag bit of an unmodulated burst is added to this burst in the jamming window (step 65). The jamming detector counts the number of unmodulated bursts in the jamming window (step 66). This is illustrated in FIG. 7 wherein a stream of modulation detection status bits is monitored in the jamming window. The status bits '0' and '1' represent a modulated burst and an unmodulated burst, respectively, in the received burst flow.

The jamming detection algorithm can be represented by means of the following equation:

$$S_j = \sum_{f=0}^{F} b_f^m \qquad (6)$$

where $S_j$ is the sum of unmodulated bursts in the jamming window and $b_f$ denotes the state of a modulation detection bit for the particular burst. F indicates the size of the fixed jamming window.

Basically, if the number of unmodulated bursts exceeds the experimentally defined threshold value, the received burst is considered to be jammed, resulting in an ON state of the jamming detection. Otherwise, the burst is determined to be uncorrupted, resulting in an OFF state of the jamming detection.

In a certain signal to noise ratio level, the number of unmodulated bursts in the time window may oscillate at the critical level of the threshold value. This causes the jamming detection to switch between the ON and OFF states. In order to avoid a blizzard of alarms, a transition interval is implemented. The transition interval sets two limits for the function, an upper and a lower limit. In step 67, it is checked whether or not the previous burst was jammed (whether the jamming detection is currently in the ON state or the OFF state). If the last burst was not jammed, the jamming detector raises a jamming detection flag bit and alarms the base station when the number of unmodulated bursts in the time window exceeds the upper limit (steps 68 and 69). If the last burst was not jammed, the jamming detector puts down a jamming detection flag bit when the number of unmodulated bursts in the time window does not exceed the upper limit (steps 68 and 71). If the last burst was jammed, the jamming detector resets the jamming detection flag bit when the number of unmodulated bursts in the time window exceeds the upper limit (steps 70 and 69). If the last burst was not jammed, the jamming detector puts down a jamming detection flag bit when the number of unmodulated bursts in the time window does not exceed the upper limit (steps 70 and 71). Consequently, the jamming detection flag bit is up until the amount of unmodulated bursts drops below the lower limit of the jamming detection. No further messages may be sent in this case and the alarm is declared. Another jamming alarm may be sent only if the number of unmodulated bursts exceeds the upper limit again. This prevents the jamming detection algorithm from misinterpreting background noise to be a jamming signal. It also prevents the algorithm from misinterpreting extremely noisy TETRA modulated signals to be a jamming signal. Thus, the transition interval reduces the amount of unnecessary alarms in the case of a varying channel.

The jamming detection also checks the RSSI-level in step 64 in order to ensure a sufficient quality for the signal. If the amplitude of the received signal is too low (below a certain predetermined limit), i.e. the RSSI-level is too low, the last burst is considered to be a modulated burst regardless of the decision of modulation detection (the algorithm proceeds from step 64 to step 63). This feature prevents unnecessary alarms if the channel is not good enough to ensure a sufficient signal quality for modulation detection.

This solution has certain problems. The jamming detection algorithm is never able to detect a jamming signal with an extremely low level. This is not a serious problem, since a low-level jamming signal would not usually affect the performance of a receiver too much. A more serious problem with this solution is that the jamming detection may misinterpret a TETRA modulated signal to be a jamming signal if the channel conditions have been difficult but the signal level has not been extremely low.

According to this aspect of the present invention, the channel information from a channel analyser is utilized for adjusting the parameter(s) of the jamming detection according the observed channel conditions. This improves the reliability of jamming detection in the cases where a TETRA modulated signal that has passed through an extremely difficult channel model has been received. In other words, the sensitivity of the jamming detection is adjusted such that the sensitivity is lower for a difficult channel in order to avoid unnecessary jamming alarms, the sensitivity being higher (better) for a normal or a less difficult channel in order to obtain more accurate detection. Thus, the overall performance of the detector is enhanced.

There are several different ways to adjust the function of the jamming detection according to the received channel information. According to an embodiment of the invention, the limit of the signal level used for rejecting the burst in jamming detection is adjusted. In other words, if the channel conditions of the signal have been difficult (e.g. channels with strong ISI), the RSSI level for rejecting the burst in the jamming detection is set lower than for a less difficult channel or a normal channel, since the possibility for misinterpreting the signal to be an unmodulated signal is stronger. The channel information may include the signal RSSI level and/or the estimated speed of the user equipment. If the velocity of the user equipment is high, also the channel power changes rapidly. This makes the decision of the jamming detection more uncertain due to rapid fluctuations in channel power. Decreasing the jamming detector limit for rapidly changing channels would thus improve the performance of the jamming detector. On the other hand, if the ISI of the radio path-is-high and signal is TETRA modulated, decreasing of the modulation detector limit would then improve the performance of the jamming detector by decreasing the possibility of an unnecessary alarm. In an embodiment of the invention, the adjustment of a jamming detector limit is implemented by adjusting the jamming detection metrics by which the jamming decision is made. For example, a limit for the number of unmodulated bursts S (obtained from equation 6) that triggers the jamming decision may be adjusted to be higher for a difficult channel than for a less difficult or a normal channel. Similarly, the upper and lower limits can be adjusted.

Figure 8:
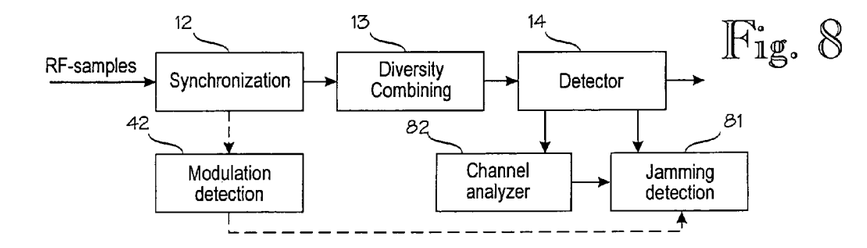
FIG. 8 illustrates an example of an architecture of a base station receiver according to an embodiment of the present invention.

An example of a base station receiver that uses the advanced modulation detection according to the invention is shown in FIG. 8.

The synchronization 12, the diversity combining 13, and the detector 14, which can be similar to those shown in FIG. 1, are not essential to this aspect of the invention. Jamming detection 81 may operate in a similar manner to that shown in the example described with reference to FIG. 6, with the exception that jamming detection is adjusted according to channel information provided by a channel analyser 82. The channel analyser 82 can provide the channel estimate information by using the methods described above, for example. The channel analyser 82 can be placed anywhere in the receiver chain but it is most adequate to place the channel analyser after the detector 14 or in parallel with the detector 14. After the detection 14 there is as much information about the received signal as it is possible to obtain. This makes the channel estimations which can be used in the measurement of channel conditions more reliable. However, depending on the implementation, the channel analyser 82 can also be located in some other place in the receiver chain. Similarly, the most adequate location for the jamming detection 81 is in association with the detector 14 but it can also be located in some other place in the receiver chain. In an embodiment of the invention wherein the number of unmodulated bursts is used for the jamming detection decision, the modulation detection similar to that described with reference to FIGS. 4 and 5 may be utilized. The modulation detection 42 and the jamming detection 81 may use the same channel analyser 82/41 or they may have different channel analysers.

Figure 9:
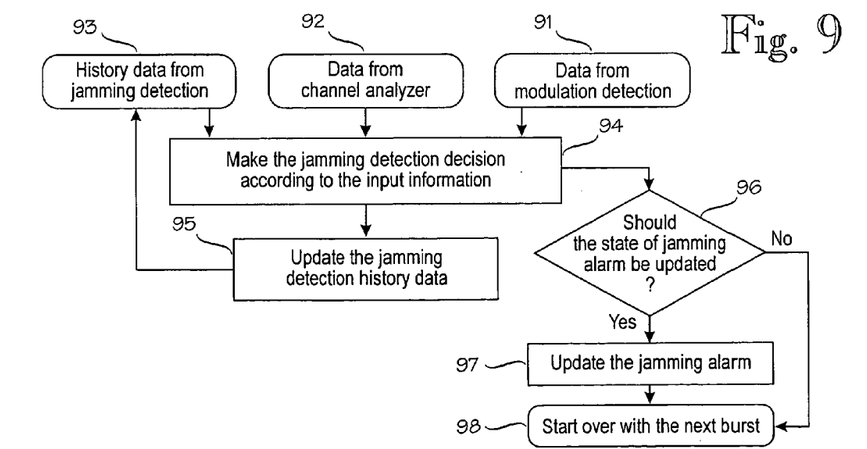
FIG. 9 is a flow diagram illustrating an example of the operation of the receiver shown in FIG. 8.

A generic flow diagram for an embodiment of the invention is illustrated in FIG. 9. The jamming detection has three different types of input-data. Firstly, there is data 91 from the modulation detection. This corresponds to step 61 in FIG. 6. Secondly,-there is history data 93 from the jamming detection. This corresponds to the information utilized in step 67 in FIG. 6. Thirdly, there is data 92 from the channel analyser 82. The data 91 and 92 may be used in a similar manner to that illustrated in FIG. 6. The data 92 from the channel analyser 82 can be used for adjusting the parameters of the jamming detection, e.g. the threshold used in step 64 and/or the upper limit and the lower limit used in step 68 and 70 can be adjusted. On the basis of the input data 91, 92 and 93, the jamming detection 81 makes the jamming detection decision (step 94) for a current burst and updates the jamming detection history data 93 with the result of this new decision (step 95). The jamming detection then makes the decision whether the state of the jamming alarm should be updated (step 96) and, if necessary, updates the jamming alarm (97). The procedure then proceeds to the next burst (step 98). Steps 96 to 98 may be embodied with steps 67 to 72 of FIG. 6, for example.

In an embodiment wherein the jamming detection decision is based on the number of unmodulated bursts, the performance of the jamming detection according to the present invention is further improved when advanced modulation detection according to the present invention is employed at the same time. This is due to the fact that the accuracy of the modulation detection directly affects the accuracy of the jamming detection and thus reduces the possibility of unnecessary alarms.

Also more generally, the base station receiver may include any combination of the different aspects and embodiments of the invention described above. In such a case, there may be several channel analysers, e.g. one for each functionality requiring channel information, or there may be a common channel analyser for all these functionalities.

In a further embodiment of the invention, the channel information is utilized for increasing the sensitivity of the TETRA base station in signalling channels. When the signal to noise ratio is extremely low, the decoded signal might be erroneous but the CRC-check matches (CRC, Cyclic Redundancy Check), the CRC-check being a method for detecting errors in the transmission of data by using a polynomial code and a cyclic check character. This kind of an erroneous decoded signalling burst can cause incorrect signalling and other problems. This problem is currently solved by discarding outright signalling bursts whose signal to noise ratio is too low. However, the optimal signal to noise ratio for discarding the burst varies depending on the channel model. If the channel model can be analysed properly, the limit used for discarding the detected signalling burst can be chosen optimally for each channel type. For example, the RSSI limit for discarding a signalling burst can be lower for channels with strong ISI than for channels with weak ISI.

It will be obvious to a person skilled in the art that as technology advances, the inventive concept can be implemented in various ways. Base band processing, for example, can take place in the base station but also—at least partly—in the exchange. The invention and its embodiments are not limited to the examples described above but may vary within the scope of the claims.

The invention claimed is:

1. A modulation detection method for a base station receiver in a wireless communications system, comprising
    receiving, at a base station receiver, a signal from user equipment over an air interface,
    continuously estimating, on the basis of information derived from said receiver signal, channel status information representing a condition of a transmission channel between the user equipment and the base station receiver,
    adaptively controlling, on the basis of the estimated channel status information, a modulation detection limit to be employed in deciding whether or not the received signal is modulated,
    calculating a cross-correlation vector between the received signal and a reference signal,
    calculating a mean value of the cross-correlation vector,
    determining a peak value in the correlation vector,
    scaling the mean value with a scaling factor,
    comparing the scaled mean value with the peak value,
    deciding, on the basis of the difference between the scaled and mean value and the peak value, whether or not the signal is modulated, and
    adaptively adjusting, on the basis of the estimated channel status information, the scaling factor.

2. The method of claim 1, wherein the estimated channel status information represents the condition of the invention in a function of the estimated velocity of the user equipment, an estimated speed of change of the channel characteristics, and/or inter-symbol interference.

3. The method of claim 1 or 2, comprising
    adaptively controlling the modulation detection limit such that the modulation detection is less sensitive when the estimated channel status information indicates a channel with rapidly changing signal conditions, and more sensitive when the estimated channel status information indicates a channel with relatively static signal conditions.

4. The method of claim 1 or 2, comprising
estimating the velocity of the user equipment,
adaptively controlling the modulation detection limit in the function of the estimated velocity such that the modulation detection is less sensitive when the estimated velocity is relatively high, and more sensitive when the estimated velocity is relatively low.

5. The method of claim 1, comprising
estimating the velocity of the user equipment,
adaptively controlling the scaling factor in the function of the estimated velocity such that the scaling factor is lower when the estimated velocity is relatively high, and the scaling factor is higher when the estimated velocity is relatively low.

6. The method of claim 1, comprising
adaptively controlling the scaling factor in the function of the estimated velocity such that the scaling factor is lower when the estimated channel status information indicates a channel with rapidly changing signal conditions, and the scaling factor is higher when the estimated channel status information indicates a channel with relatively static signal conditions.

7. A jamming detection method for a base station receiver in a wireless communications system, comprising
receiving, at a base station receiver, a signal from user equipment over an air interface,
continuously estimating, on the basis of information derived from said received signal, channel status information representing a condition of a transmission channel between the user equipment and the base station receiver,
using at least one jamming detection decision limit in deciding whether or not the received signal is jammed,
counting a number of unmodulated bursts in the received signal within a jamming window,
deciding the received signal to be jammed, if the counted number of unmodulated bursts within the jamming window exceeds a predetermined limit,
dynamically adjusting at least one jamming detection decision limit on the basis of the estimated channel status information such that the jamming detection is less sensitive when the estimated channel status information indicates that the channel has a high tendency to cause false jamming alarms, and the jamming detection is more sensitive when the estimated channel status information indicates that the channel has a high tendency to cause false jamming alarms.

8. The method of claim 7, wherein the estimated channel status information represents the condition of the channel in a function of the velocity of the user equipment, a speed of change of the channel characteristics and/or inter-symbol interference.

9. The method of claim 7, comprising
using at least one jamming detection decision limit in deciding whether or not the received signal is jammed,
adaptively controlling the at least one jamming detection decision limit on the basis of the estimated channel status information such that the jamming detection is less sensitive when the estimated channel status information indicates that the channel has a high tendency to cause false jamming alarms, and the jamming detection is more sensitive when the estimated channel status information indicates that the channel has a high tendency to cause false jamming alarms.

10. The method of claim 7, comprising
estimating the velocity of the user equipment,
adaptively controlling the at least one jamming detection decision limit in the function of the estimated velocity such that the jamming detection is
less sensitive when the estimated velocity is relatively high, and the jamming detection is more sensitive when the estimated velocity is relatively low.

11. The method of claim 7, comprising
estimating an inter-symbol interference effect on the channel,
adaptively controlling the at least one jamming detection decision limit in the function of the estimated inter-symbol interference effect such that the jamming detection is less sensitive when the estimated inter-symbol interference effect is strong, and the jamming detection is more sensitive when the estimated inter-symbol interference effect is relatively low.

12. The method of claim 7, wherein the dynamically adjusting comprises
adjusting a higher value for the predetermined limit when an estimated speed of the user equipment is relatively high or an estimated inter-symbol interference effect of the channel is relatively strong,
adjusting a lower value for the predetermined limit when an estimated speed of the user equipment is relatively low or an estimated inter-symbol interference effect of the channel is relatively low.

13. A jamming detection method for a base station receiver in a wireless communications system, comprising
receiving, at a base station receiver, a signal from user equipment over an air interface,
continuously estimating, on the basis of information derived from said received signal, channel status information representing a condition of a transmission channel between the user equipment and the base station receiver,
carrying out modulation detection on the received signal in order to recognise modulated and unmodulated bursts,
comparing a received signal strength of each of the unmodulated bursts with a threshold level,
classifying the burst as a modulated burst regardless of the modulation detection result, if the received signal strength of the burst is lower than the threshold level,
counting a number of unmodulated bursts in the received signal within a jamming window,
deciding the received signal to be jammed, if the counted number of unmodulated bursts within the jamming window exceeds a predetermined limit, and
dynamically adjusting the threshold level on the basis of the estimated channel status information such that the jamming detection is less sensitive when the estimated channel status information indicates that the channel has a high tendency to cause false jamming alarms, and the jamming detection is more sensitive when the estimated channel status information indicates that the channel has a high tendency to cause false jamming alarms.

14. The method of claim 13, comprising
adjusting a lower value for the threshold level when an estimated speed of the user equipment is relatively high or an estimated inter-symbol interference effect of the channel is relatively strong, adjusting a higher value for the threshold level, when an estimated speed of the user equipment is relatively low or an estimated inter-symbol interference effect of the channel is relatively low.

15. A base station receiver for a wireless communications system, comprising
a channel analyser configured to provide, on the basis of information derived from a signal received at the base station receiver from user equipment over an air interface, channel status information representing a condition of a transmission channel between the user equipment and the base station receiver,
an adaptive modulation detector including means configured to calculate a cross-correlation vector between the received signal and a reference signal, means configured to calculate a mean value of the cross-correlation vector, means configured to determine a peak value in the correlation vector, means configured to scale the mean value with a scaling factor, means configured to compare the scaled mean value with the peak value, and means configured to decide, on the basis of the difference between the scaled and mean value and the peak value, whether or not the signal is modulated, and
a controller configured to control operation of the modulation detector by adjusting the scaling factor on the basis of the estimated channel status information.

16. A base station receiver for a wireless communications system, comprising
a channel analyser configured to provide, on the basis of information derived from a signal received at the base station receiver from user equipment over an air interface, channel status information representing a condition of a transmission channel between the user equipment and the base station receiver,
an adaptive jamming detector using at least one jamming detection decision limit in deciding whether or not the received signal is jammed, and including means configured to carry out modulation detection on the received signal in order to recognize modulated and unmodulated bursts, means configured to compare a received signal strength of each of the unmodulated bursts with a threshold level, means configured to classify the burst as a modulated burst regardless of the modulation detection result, if the received signal strength of the burst is lower than the threshold level, means configured to count a number of unmodulated bursts in the received signal within a jamming window, and means configured to decide the received signal to be jammed, if the counted number of unmodulated bursts within the jamming window exceeds a predetermined limit, and
a controller configured to dynamically control the threshold level on the basis of the estimated channel status information such that the jamming detection is less sensitive when the estimated channel status information indicates that the channel has a high tendency to cause false jamming alarms, and the jamming detection is more sensitive when the estimated channel status information indicates that the channel has a high tendency to cause false jamming alarms.

* * * * *